US012555489B2

United States Patent
Norel et al.

(10) Patent No.: US 12,555,489 B2
(45) Date of Patent: Feb. 17, 2026

(54) LARGE LANGUAGE MODEL-ENABLED ARTIFICIAL INTELLIGENCE-BASED VIRTUAL INTERACTIVE READING ASSISTANT

(71) Applicant: International Business Machines Corporation, Armonk, NY (US)

(72) Inventors: Raquel Norel, Bronx, NY (US); Chen Wang, Chappaqua, NY (US); Carla Paola Agurto Rios, Ossining, NY (US); Bo Wen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/629,058

(22) Filed: Apr. 8, 2024

(65) Prior Publication Data

US 2025/0316183 A1  Oct. 9, 2025

(51) Int. Cl.
G09B 7/02 (2006.01)
G09B 17/00 (2006.01)
G10L 15/183 (2013.01)
G10L 15/22 (2006.01)

(52) U.S. Cl.
CPC .............. *G09B 17/003* (2013.01); *G09B 7/02* (2013.01); *G10L 15/183* (2013.01); *G10L 15/22* (2013.01); *G10L 2015/225* (2013.01)

(58) Field of Classification Search
CPC ......... G10L 15/183; G10L 15/22; G09B 7/02; G09B 17/003
See application file for complete search history.

(56) References Cited

U.S. PATENT DOCUMENTS

2023/0074406 A1  3/2023  Baeuml et al.

OTHER PUBLICATIONS

Author unknown, "ReAct," LangChain, 2024, 4 pages, langchain.com, accessed Mar. 25, 2024, https://python.langchain.com/docs/modules/agents/agent_types/react.
Author unknown, "Structured chat," LangChain, 2024, 4 pages, langchain. com, accessed Mar. 25, 2024, https://python.langchain.com/docs/modules/agents/agent_types/structured_chat.
Gao et al., "Chat-REC: Towards Interactive and Explainable LLMs-Augmented Recommender System," Arxiv, Apr. 4, 2023, pp. 1-17, arxiv.org, accessed Mar. 13, 2024, https://arxiv.org/abs/2303.14524.

(Continued)

*Primary Examiner* — Kesha Frisby
(74) *Attorney, Agent, or Firm* — Yee & Associates, P.C.

(57) ABSTRACT

Interactive reading comprehension is provided. An analysis of a set of responses received from a user to a set of interactive comprehension questions related to a set of main topics in a digital book up to where the user stopped reading in the digital book in accordance with a set reading schedule is performed using a large language model of an artificial intelligence (AI)-based virtual interactive reading assistant. A level of comprehension of the main topics in the digital book is determined using the large language model of the AI-based virtual interactive reading assistant based on the analysis of the set of responses. The user is engaged in a discussion regarding the main topics in the digital book using the large language model of the AI-based virtual interactive reading assistant based on the level of comprehension of the main topics by the user.

3 Claims, 7 Drawing Sheets

(56) References Cited

OTHER PUBLICATIONS

Ning et al., "Album Storytelling with Iterative Story-aware Captioning and Large Language Models," May 24, 2023, Arxiv, pp. 1-23, arxiv.org, accessed Mar. 13, 2024, https://arxiv.org/abs/2305.12943.

Srivastava, "A day in the life of ChatGPT as an academic reviewer: Investigating the potential of large language model for scientific literature review," OSF Preprints, Feb. 16, 2023, pp. 1-12, osf.io, accessed Mar. 13, 2024, https://osf.io/preprints/osf/wydct.

Wang, B. et al., "Enabling Conversational Interaction with Mobile UI using Large Language Models," Proceedings of the 2023 CHI Conference on Human Factors in Computing Systems (CHI '23), Apr. 23-28, 2023, pp. 1-17, Article No. 432, Association for Computing Machinery, accessed Mar. 13, 2024, https://dl.acm.org/doi/abs/10.1145/3544548.3580895.

Wang, D. et al., "GujiBERT and GujiGPT: Construction of Intelligent Information Processing Foundation Language Models for Ancient Texts," Arxiv, Jul. 11, 2023, 22 pages, arxiv.org, accessed Mar. 13, 2024, https://arxiv.org/abs/2307.05354.

Yao et al., "ReAct: Synergizing Reasoning and Acting in Language Models," GitHub, 2022, 3 pages, github.io, accessed Mar. 14, 2024, https://react-lm.github.io/.

Yoshii et al., "Screening of Mild Cognitive Impairment Through Conversations With Humanoid Robots: Exploratory Pilot Study," JMIR Formative Research, Jan. 13, 2023, 13 pages, jmir.org, accessed Mar. 13, 2024, https://formative.jmir.org/2023/1/e42792.

Zhang et al., "Recommendation as Instruction Following: A Large Language Model Empowered Recommendation Approach," Arxiv, May 11, 2023, 13 pages, arxiv.org, accessed Mar. 13, 2024, https://arxiv.org/abs/2305.07001.

Zhiyuli et al., "BookGPT: A General Framework for Book Recommendation Based on a Large Language Model," Arxiv, May 25, 2023, 15 pages, arxiv.org, accessed Mar. 13, 2024, https://arxiv.org/abs/2305.15673.

PSEUDOCODE
300

FIG. 3A

```
from LLM language framework import Assistant, Tool, BaseTool, tool
from data validation library import BaseModel
import random

Define classes   ← 302 class Book(BaseModel):   ← 308
    title: str
    genre: str class Schedule(BaseModel):   ← 310
    frequency: str
    speed: str class Discussion(BaseModel):   ← 312
    comprehension_questions: list
    deeper_discussions: list class MemoryRecall(BaseModel):   ← 314
    tasks: list class GroupReading(BaseModel):   ← 316
    participants: list
    reminders: list

Define tools   ← 304

@tool
def select_book(book: Book):   ← 318
    if book.title:
        # If user selects a particular book, return that book
        return book.title
    else:
        # If user asks for a recommendation, propose a set of genres
        genres = ['thriller', 'romance', 'mystery', 'science fiction', 'fantasy', 'horror', 'historical fiction']
        selected_genre = random.select(genres)

# Based on the selected genre, recommend a list of books
        recommended_books = get_books_by_genre(selected_genre)
        return recommended_books
```

PSEUDOCODE 300

FIG. 3B

```
@tool
def schedule_sessions(schedule: Schedule):  ← 320
    # Ask user about preferred reading speed and preferred frequency of sessions
    reading_speed = schedule.speed
    session_frequency = schedule.frequency

# Propose a schedule based on user preference
    proposed_schedule = propose_schedule(reading_speed, session_frequency)
    return proposed_schedule @tool
def discuss_book(discussion: Discussion):  ← 322
    # Start discussion with comprehension questions
    for question in discussion.comprehension_questions:
        ask_question(question)

# Delve into deeper discussions
    for topic in discussion.deeper_discussions:
        discuss_topic(topic)

# Record key points of discussion
    key_points = record_discussion()
    return key_points @tool
def select_next_book(book: Book):  ← 324
    # Ask user if user wants to select the next book or prefer a recommendation
    if book.title:
        return book.title
    else:
        # Recommend a book based on user's reading history and preferences
        recommended_book = recommend_book()
        return recommended_book @tool
def memory_recall(memory: MemoryRecall):  ← 326
    # Incorporate memory recall tasks into interactive sessions
    for task in memory.tasks:
        perform_task(task)

# Track user's performance
    performance = track_performance()
    return performance
```

PSEUDOCODE
300

```
@tool
def group_reading(group: GroupReading):  ── 328
    # Facilitate scheduling of group reading sessions
    schedule_sessions(group.participants)

# Send reminders to all user members of group
    for user in group.users:
        send_reminder(user.member)

# Facilitate group discussion
    facilitate_discussion(group.participants)

# Record key points of group discussion
    key_points = record_discussion()
    return key_points

Define assistant ── 306 class AI-based virtual interactive reading assistant(Assistant):
    def __init__(self, tools):
        super().__init__(tools)

def run(self):
        # Implement logic for running assistant ── 330 pass

Instantiate assistant ── 332 tools = [select_book, schedule_sessions, discuss_book, select_next_book, memory_recall, group_reading]
assistant = AI-BasedVirtualInteractiveReadingAssistant(tools)

Run the assistant ── 334 assistant.run()
```

LARGE LANGUAGE MODEL-ENABLED ARTIFICIAL INTELLIGENCE-BASED VIRTUAL INTERACTIVE READING ASSISTANT

BACKGROUND

The disclosure relates generally to Large Language Models and more specifically to determining reading comprehension.

A Large Language Model (LLM) is, for example, an artificial neural network, a recurrent neural network, or the like that is capable of achieving language generation and other natural language processing tasks such as classification. LLMs acquire these language generation and processing capabilities by learning statistical relationships from text documents during a computationally intensive self-supervised and semi-supervised training process. LLMs can be used for text generation, a form of generative artificial intelligence (AI), by taking an input text and repeatedly predicting the next word.

LLMs can be prompt-engineered to accomplish specific tasks. These prompt-engineered LLMs acquire knowledge about syntax, semantics, and ontology inherent in human language corpora. Prompt engineering is the process of structuring text that can be interpreted and understood by an LLM (e.g., generative AI model). A prompt is natural language text describing the task that an LLM should perform. For example, a prompt for a text-to-text LLM can be a query, a command, or a statement including context, instructions, and conversation history. Further, prompt engineering may involve phrasing a query, specifying a style, providing relevant context, providing environment observations, assigning a role to the LLM, and the like.

Prompt engineering is enabled by in-context learning, defined as an LLM's ability to temporarily learn from prompts. In other words, what has been learnt during in-context learning is of a temporary nature, which is in contrast to training for each specific task, which is not temporary. Thus, in-context learning does not carry the temporary contexts, except those contexts already present in the training dataset, from one conversation to another.

Chain-of-thought prompting allows LLMs to solve a problem as a series of intermediate steps before giving a final answer. Chain-of-thought prompting improves reasoning ability by inducing the LLM to answer a multi-step problem with steps of reasoning that mimic a train of thought. Chain-of-thought prompting allows LLMs to overcome difficulties with some reasoning tasks that require logical thinking and multiple steps to solve, for example, commonsense reasoning questions.

SUMMARY

According to one illustrative embodiment, a computer-implemented method for interactive reading comprehension is provided. A computer, using a large language model of an artificial intelligence (AI)-based virtual interactive reading assistant, performs an analysis of a set of responses received from a user to a set of interactive comprehension questions related to a set of main topics in a digital book up to where the user stopped reading in the digital book in accordance with a set reading schedule. The computer, using the large language model of the AI-based virtual interactive reading assistant, determines a level of comprehension of the main topics in the digital book up to where the user stopped reading based on the analysis of the set of responses received from the user to the set of interactive comprehension questions. The computer, using the large language model of the AI-based virtual interactive reading assistant, engages the user in a discussion regarding the main topics in the digital book up to where the user stopped reading in accordance with the set reading schedule based on the level of comprehension of the main topics by the user. According to other illustrative embodiments, a computer system and computer program product for interactive reading comprehension are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
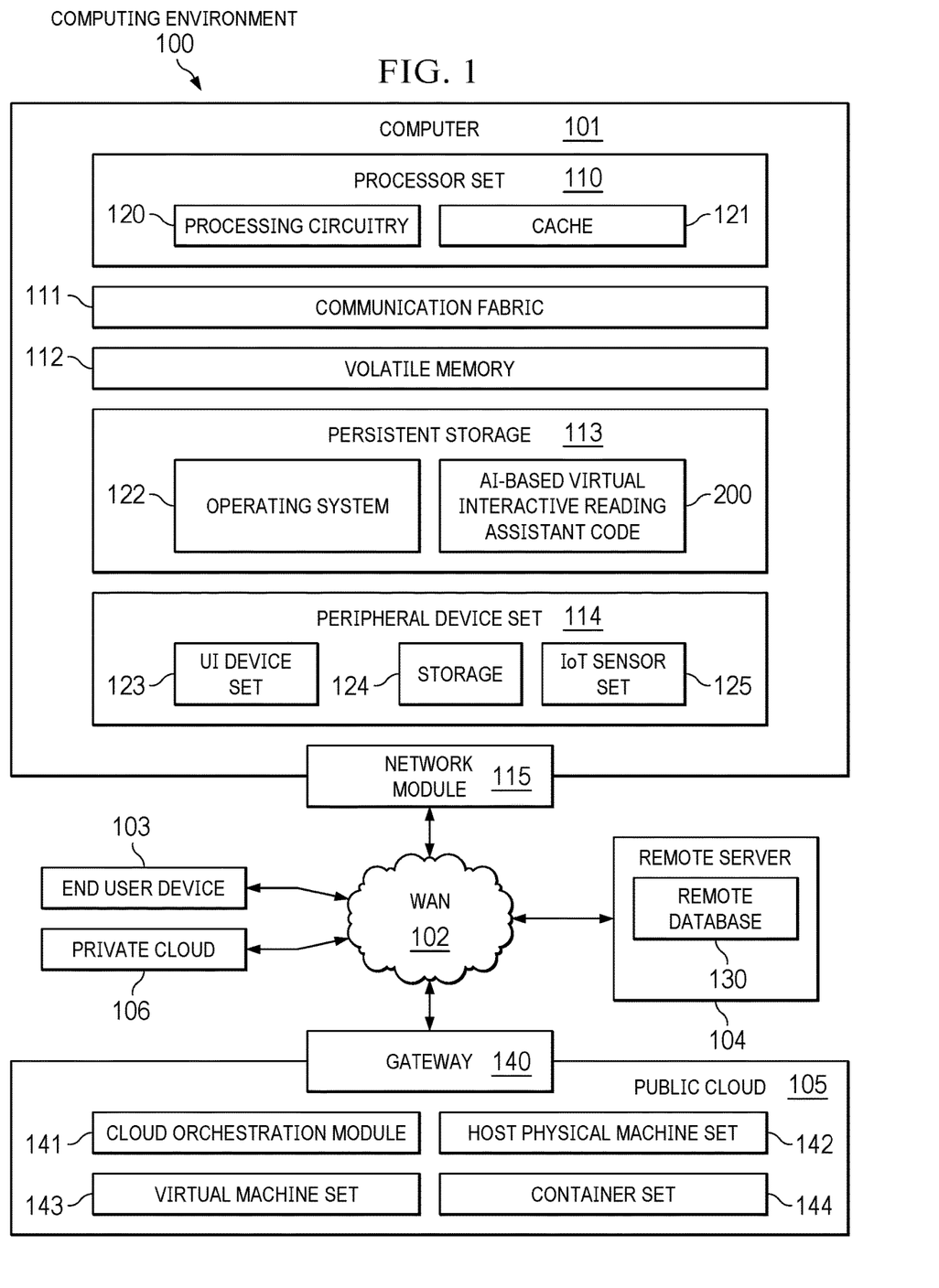
FIG. 1 is a pictorial representation of a computing environment in which illustrative embodiments may be implemented.
Figure 2:
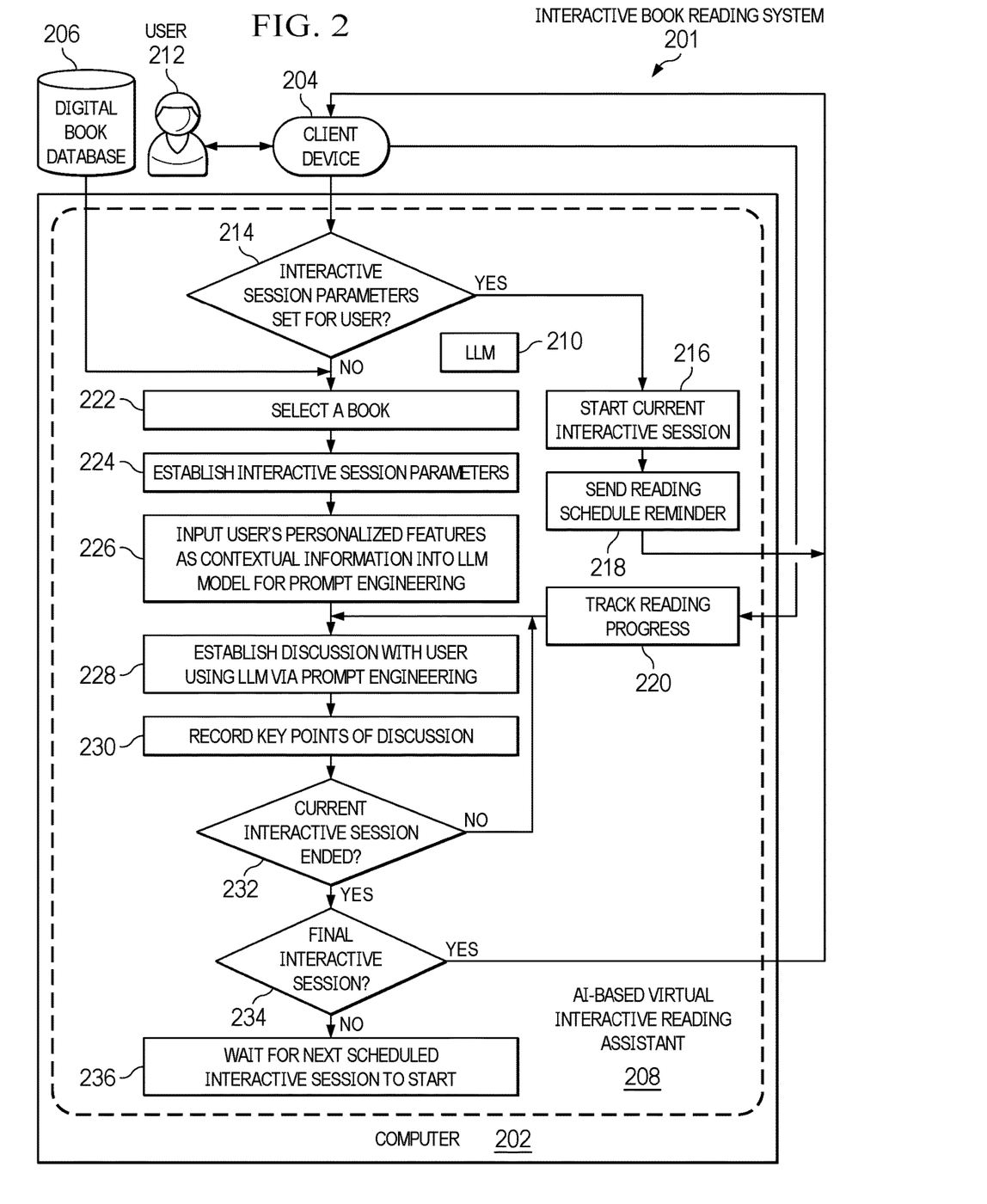
FIG. 2 is a diagram illustrating an example of an interactive reading system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as artificial intelligence (AI)-based virtual interactive reading assistant code 200.

For example, AI-based virtual interactive reading assistant code 200 implements an AI-based virtual interactive reading assistant, utilizing a Large Language Model (LLM), which is designed to enhance the reading experience of users by actively engaging the users in discussions regarding the books the users have read. As a user progresses through a book (e.g., chapter by chapter), the AI-based virtual interactive reading assistant of illustrative embodiments, utilizing the LLM, interacts with the user by asking comprehension questions to ensure that the user has grasped the main ideas in the reading, which can trigger debate between the AI-based virtual interactive reading assistant of illustrative embodiments and the user regarding the content of the book. This interaction between the AI-based virtual interactive reading assistant of illustrative embodiments and the user fosters an environment of intellectual stimulation, while providing companionship. As a result of providing companionship, the AI-based virtual interactive reading assistant of illustrative embodiments can address feelings of isolation or loneliness by the user. It should be noted that the AI-based virtual interactive reading assistant of illustrative embodiments, utilizing the LLM, can accommodate both text-based and audio-based book formats. By accommodating audio-based book formats, the AI-based virtual interactive reading assistant of illustrative embodiments is available to those individuals having vision issues or an inability to read.

Further, the AI-based virtual interactive reading assistant of illustrative embodiments can act as a virtual host for a book club that includes a group of users. The AI-based virtual interactive reading assistant of illustrative embodiments, utilizing the LLM, performs tasks, such as, for example, scheduling group reading sessions, sending reminder notifications, providing book recommendations based on past readings and user preferences, facilitating book reading discussions, and recording key points discussed during the interactive book reading sessions. The AI-based virtual interactive reading assistant of illustrative embodiments includes a personalization feature, which enables the AI-based virtual interactive reading assistant of illustrative embodiments to adjust its interactive approach to a particular user based on the cognitive needs of that particular user. Thus, the AI-based virtual interactive reading assistant of illustrative embodiments can be a valuable tool for applying cognitive exercises, such as, for example, memory recall exercises, to the user.

In addition to AI-based virtual interactive reading assistant code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and AI-based virtual interactive reading assistant code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in AI-based virtual interactive reading assistant code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user of the AI-based virtual interactive reading assistant services provided by computer 101), and may take any of the forms discussed above in connection with computer 101. EUD 103 typically receives helpful and useful data from the operations of computer 101. For example, in a hypothetical case where computer 101 is designed to provide a book recommendation to the end user, this recommendation would typically be communicated from network module 115 of computer 101 through WAN 102 to EUD 103. In this way, EUD 103 can display, or otherwise present, the book recommendation to the end user. In some embodiments, EUD 103 may be a client device, such as thin client, heavy client, desktop computer, laptop computer, tablet computer, smart phone, smart glasses, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a book recommendation based on historical user book reading data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Typically, users who feel isolated often struggle to stay intellectually engaged and stimulated due to limited social interaction. The current method of addressing this issue of isolation involves direct human interaction, which can be challenging to maintain all the time. Isolation is a problem affecting the overall well-being of an individual and has profound implications. This isolation problem extends to other individuals who find it challenging to connect with others due to various reasons, such as, for example, physical health issues, social anxiety, and the like.

The AI-based virtual interactive reading assistant of illustrative embodiments, utilizing an LLM, addresses this user isolation problem by providing an interactive reading experience that not only engages users intellectually, but also provides a sense of companionship. The AI-based virtual interactive reading assistant of illustrative embodiments is available to any and all users around the world at any time of day or night and in any place where a user has a network connection. Moreover, the AI-based virtual interactive reading assistant of illustrative embodiments is capable of communicating with users in any standard language around the world. Furthermore, the AI-based virtual interactive reading assistant of illustrative embodiments is able to access a plurality of different virtual book databases containing vast numbers of virtual books in a plurality of different languages.

As a result, the AI-based virtual interactive reading assistant of illustrative embodiments can facilitate stimulating discussions regarding any book read by a user, encouraging user comprehension and critical thinking. The AI-based virtual interactive reading assistant of illustrative embodiments can also simulate the experience of being in a group book club, thus reducing user feelings of isolation.

Furthermore, the AI-based virtual interactive reading assistant of illustrative embodiments includes a personalization feature that adjusts the interactive tasks based on the cognitive needs of a particular user, promoting mental fitness. This personalization feature is particularly valuable for those users needing specific cognitive exercises, such as those related to short-term memory. By providing consistent intellectual stimulation and social interaction, the AI-based virtual interactive reading assistant of illustrative embodiments, utilizing the LLM, significantly contributes to alleviating the feelings of loneliness and enhancing the overall quality of life of its users. Entities, such as, for example, nursing homes, rehabilitation centers, long-term healthcare facilities, educational institutions, and the like, can utilize the AI-based virtual interactive reading assistant of illustrative embodiments.

Loneliness in individuals has an impact that affects both the individuals and society as a whole. While it is challenging to precisely quantify the impact, several factors contribute to the overall cost. For example, loneliness is associated with poorer physical and mental health outcomes, leading to increased healthcare utilization. Individuals experiencing loneliness may have higher rates of chronic conditions, depression, anxiety, and other health issues, requiring more frequent medical visits, medications, and treatments. In addition, loneliness can contribute to the need for long-term care services. As loneliness increases the risk of cognitive decline and functional limitations, individuals may require additional support in the form of nursing homes, assisted living facilities, or in-home caregivers, resulting in implications for families and healthcare systems. Further, loneliness can negatively impact the productivity of individuals. When individuals feel isolated and disconnected, their motivation, cognitive abilities, and overall performance may decline. This can result in reduced productivity, early retirement, and decreased engagement in activities, leading to potential losses at both the individual and societal levels.

Loneliness not only affects the individuals themselves but also places a burden on caregivers. Family members or professional caregivers may experience increased stress, burnout, and reduced work productivity when providing support to these individuals.

The AI-based virtual interactive reading assistant of illustrative embodiments, using the LLM, addresses the problem of engagement and intellectual stimulation of users experiencing loneliness by providing an interactive reading experience. The AI-based virtual interactive reading assistant of illustrative embodiments not only administers individual and group user scheduling and reminders for reading sessions but also recommends books for consideration. Additionally, the AI-based virtual interactive reading assistant of illustrative embodiments acts as a reading companion, reviews the user's past reading selections, facilitates discourse with the user, generates questions in line with reading schedules, and records the interactive discussion key points.

By illustrative embodiments integrating the LLM into the AI-based virtual interactive reading assistant, users can engage in conversations with the AI-based virtual interactive reading assistant and take comprehension tests administered by the AI-based virtual interactive reading assistant to ensure that the users understand the main ideas in the book. Consequently, the AI-based virtual interactive reading assistant of illustrative embodiments provides a means of connection and stimulation for users who may struggle with interaction with others, ultimately combating feelings of loneliness and providing a valuable learning and social experience.

The AI-based virtual interactive reading assistant of illustrative embodiments can be used in educational settings, such as, for example, schools, colleges, universities, and online learning platforms. Student users can read educational books and receive real-time feedback regarding comprehension level of the book's content from the AI-based virtual interactive reading assistant of illustrative embodiments and engage the student users in conversations to enhance their understanding of the main ideas in the books.

Furthermore, the AI-based virtual interactive reading assistant of illustrative embodiments can be implemented in language learning platforms where users read books in a target language. In other words, the AI-based virtual interactive reading assistant of illustrative embodiments can engage users in any standard language used around the world. Thus, the AI-based virtual interactive reading assistant of illustrative embodiments can provide interactive questions and discussions in any target language, helping users improve their language skills while comprehending the book's content.

Moreover, the AI-based virtual interactive reading assistant of illustrative embodiments can be integrated in book club platforms, providing an added layer of engagement and learning. Book club members can read chapters together and discuss their comprehension with the AI-based virtual interactive reading assistant of illustrative embodiments, fostering deeper understanding and stimulating conversations among the members of the book club.

The AI-based virtual interactive reading assistant of illustrative embodiments also provides personalized learning. For example, the AI-based virtual interactive reading assistant of illustrative embodiments can adapt to an individual user's reading level and preferences over time. By analyzing user responses and comprehension levels over time, the AI-based virtual interactive reading assistant of illustrative embodiments can tailor the interactive questions and conversations to each respective user, providing a personalized learning experience.

In addition, the AI-based virtual interactive reading assistant of illustrative embodiments can be utilized in professional development and corporate training programs. Users can read industry-specific books and engage in interactive conversations with the AI-based virtual interactive reading assistant of illustrative embodiments, deepening the users' knowledge and skills in their respective fields. However, it should be noted that the AI-based virtual interactive reading assistant of illustrative embodiments enables respective users to engage in self-paced learning, where each respective user can read books at their own convenience and pace and receive immediate feedback and conversational guidance from the AI-based virtual interactive reading assistant of illustrative embodiments. As a result, the AI-based virtual interactive reading assistant of illustrative embodiments promotes independent user learning and continuous improvement.

Illustrative embodiments define a plurality of tasks that the AI-based virtual interactive reading assistant is to perform. For example, task 1, which is optional, is selecting a book. If a user has selected a specific book (e.g., the user read a recommendation for that book from a reputable source), the AI-based virtual interactive reading assistant of illustrative embodiments can start discussing that specific book upon locating the book in a digital book database associated with the AI-based virtual interactive reading assistant of illustrative embodiments. Alternatively, if the user asks the AI-based virtual interactive reading assistant of illustrative embodiments for a book recommendation, the AI-based virtual interactive reading assistant of illustrative embodiments proposes a few genres, such as, for example, thriller, romance, mystery, science fiction, fantasy, horror, historical fiction, and the like, for the user to select from. Based on the user-selected genre, the AI-based virtual interactive reading assistant of illustrative embodiments recommends a list of books selected from one or more digital book databases. The AI-based virtual interactive reading assistant of illustrative embodiments tracks and records all of the books the user reads, along with the user's preferences (e.g., likes and dislikes), over time to refine future book recommendations, thereby personalizing the user's reading experience.

Task 2, which is optional, is scheduling reading sessions. For example, the AI-based virtual interactive reading assistant of illustrative embodiments asks the user regarding the user's preferred reading speed and preferred frequency of interactive sessions with the AI-based virtual interactive reading assistant of illustrative embodiments. Afterward, the AI-based virtual interactive reading assistant of illustrative embodiments proposes a reading and interaction schedule, which can be at the end of each chapter, after a specified number of pages read, at the end of the book, or the like, based on the user's preferred reading speed and frequency of interactive sessions.

Task 3 is discussing the book. For example, the AI-based virtual interactive reading assistant of illustrative embodiments can start the interactive session by asking comprehension questions to determine whether the user understood the book's main ideas, topics, themes, and the like. In addition, the AI-based virtual interactive reading assistant of illustrative embodiments can then delve into a deeper discussion by asking the user about the user's thoughts and opinions about specific events, characters, or themes within the book. This deeper discussion can involve, for example, discussing historical accuracy of the book, surprise elements in the book, or the like. Thus, the AI-based virtual interactive reading assistant of illustrative embodiments encourages the user to think critically and share insights about the book, fostering an engaging and stimulating interaction. In addition, the AI-based virtual interactive reading assistant of illustrative embodiments records the key points of each interactive session for future reference to aid in the development of personalized readings and discussion recommendations for the user.

Task 4 is selecting the next book and scheduling future interactive sessions. For example, after the user finishes the book, the AI-based virtual interactive reading assistant of illustrative embodiments asks the user whether the user wants to select the next book or whether the user prefers a book recommendation from the AI-based virtual interactive reading assistant of illustrative embodiments based on the recorded reading history and preferences of the user. Upon selection of the next book, the AI-based virtual interactive reading assistant of illustrative embodiments repeats task 2 by asking the user about the user's preferred reading speed and preferred interaction frequency, and then schedules the reading and interactive sessions accordingly.

Task 5, which is optional, is memory recall and cognitive exercises. For example, the AI-based virtual interactive reading assistant of illustrative embodiments incorporates cognitive exercises into the interactive sessions with the user. The cognitive exercises can include, for example, memory recall tasks related to the book, such as recalling main character names, plot events, or key themes. The AI-based virtual interactive reading assistant of illustrative embodiments adjusts the cognitive exercises based on the determined cognitive needs and abilities of the user (e.g., making the cognitive exercises more challenging or simpler as needed over time). Moreover, the AI-based virtual interactive reading assistant of illustrative embodiments records the user's performance during these cognitive exercises, provides cognitive performance feedback to the user, and adjusts future cognitive exercises to best benefit the user's mental fitness.

Task 6, which is optional, is facilitation of group reading sessions. For example, when the AI-based virtual interactive reading assistant of illustrative embodiments is used in a group setting, the AI-based virtual interactive reading assistant of illustrative embodiments facilitates the scheduling of group reading sessions, sends reminders to all members in the group, and facilitates group discussions. In addition, the AI-based virtual interactive reading assistant of illustrative embodiments records the key points of the group discussions, provides a summary at the end of each session to each member of the group, and stores this information for future reference. Further, the AI-based virtual interactive reading assistant of illustrative embodiments moderates the group discussion to ensure that all members of the group are provided an opportunity to speak in the discussion and that the discussion remains respectful and focused on the book.

Alternative illustrative embodiments can follow the same AI-based virtual interactive reading assistant implementation as above, but define a different set of tasks that the AI-based virtual interactive reading assistant is to perform, enabling different behaviors and functionalities of the AI-based virtual interactive reading assistant. Task 1 of alternative illustrative embodiments is membership and personalization. For example, the AI-based virtual interactive reading assistant of alternative illustrative embodiments collects information regarding reading preferences of the user. The AI-based virtual interactive reading assistant of alternative illustrative embodiments also takes into account whether the user wants to keep the sessions closed or open to other users. The AI-based virtual interactive reading assistant of alternative illustrative embodiments utilizes this information to personalize the user's experience.

Task 2 is book selection. For example, the AI-based virtual interactive reading assistant of alternative illustrative embodiments either accepts a book selected by the user or makes a book recommendation based on the user's preferences and past readings. In addition, the AI-based virtual interactive reading assistant of alternative illustrative embodiments can propose book genres, such as, for example, thriller, romance, mystery, science fiction, fantasy, horror, historical fiction, and the like, to the user. The AI-based virtual interactive reading assistant of alternative illustrative embodiments records the user's preferences such as likes and dislikes to help with future book recommendations.

Task 3 is setting the focus. For example, the AI-based virtual interactive reading assistant of alternative illustrative embodiments determines the focus of the interactive session based on the user's preferences. The focus guides the selection of books and the topic of the discussions.

Task 4 is scheduling interactive sessions. For example, the AI-based virtual interactive reading assistant of alternative illustrative embodiments schedules the interactive sessions based on the speed at which the user prefers to read the book. The AI-based virtual interactive reading assistant of alternative illustrative embodiments can conduct the interactive session after each chapter, after the user reads a specified number of pages in the book, or after the user finishes the entire book.

Task 5 is setting session time and place. For example, the AI-based virtual interactive reading assistant of alternative illustrative embodiments schedules the interactive sessions at a time convenient for the user. The AI-based virtual interactive reading assistant of alternative illustrative embodiments also decides the platform for the interactive sessions, ensuring that the user is familiar and comfortable with the platform.

Task 6 is conducting the interactive sessions. For example, the AI-based virtual interactive reading assistant of alternative illustrative embodiments manages the sessions by setting guidelines for discussions. The AI-based virtual interactive reading assistant of alternative illustrative embodiments leads the discussions or alternatively designates a leader in the group if needed. The AI-based virtual interactive reading assistant of alternative illustrative embodiments also ensures that the discussions stay on topic.

Task 7 is discussion preparation. For example, the AI-based virtual interactive reading assistant of alternative illustrative embodiments prepares a set of discussion questions ahead of time based on analyzing the content of the book. The AI-based virtual interactive reading assistant of alternative illustrative embodiments can start a session with easy questions to engage the user initially and then gradually move to more complex questions or issues.

Task 8 is additional activities. For example, the AI-based virtual interactive reading assistant of alternative illustrative embodiments can recommend additional activities related to the book to make the user experience more memorable. This recommendation can include, for example, food recommendations, hosting a book-to-movie watch party, virtual outings inspired by the book, and the like.

Task 9 is special invitations. For example, when possible, the AI-based virtual interactive reading assistant of alternative illustrative embodiments can invite the author of the book to an interactive session. Of course, this special invitation is subject to the book authors' availability and willingness to participate in the session.

Task 10 is post-book reading activities. For example, once the user finishes the book, the AI-based virtual interactive reading assistant of alternative illustrative embodiments facilitates a discussion about the user's overall impression of the book and engages the user in determining the next book to read and scheduling subsequent interactive sessions.

An illustrative example of an interactive session between the AI-based virtual interactive reading assistant of illustrative embodiments and a user follows. AI-based virtual interactive reading assistant: Hello, how are you today? User: Hi, I'm doing great. I really enjoyed the book you recommended and have so many questions. AI-based virtual interactive reading assistant: Okay, let's start the session. Last time you agreed to read chapter X [reading set during previous session]. Do you want to discuss it? User: Yes. You know, I like all the details the author used to describe the main character. Do you think the main character is actually like that in real life? Or did the author exaggerate a bit about all the quirks? AI-based virtual interactive reading assistant: I think the author may have exaggerated a little in some parts, but I found an interview where the real main character admits being a neat freak that even irons socks. Do you know someone like that? User: I know people with the opposite characteristics hahaha. I also liked the part when the main character was discussing with another character and when I started imagining the situation it made me cry. I think the way that the author writes is brilliant. I feel very emotional when I read other books by this author. I kept wondering what was inside the tiny red box. Do you think the author will reveal that in a sequel? . . . .

AI-based virtual interactive reading assistant: For our next session let me recommend another book by another author [book recommendation based on previous readings by the user and current interaction]. This other author has a similar writing style, but this author's books have tons of suspense that I think you will enjoy. User: I love suspense and even more when it is based on real stories. I will definitely read it. AI-based virtual interactive reading assistant: Great! I know another person that is reading the same book. Would it be okay for me to invite this other person and have a group interactive session? User: Sure, let's do that. I will start reading the book. Hopefully, it has a lot of mystery. Bye. AI-based virtual interactive reading assistant: Bye. Have a nice day.

Thus, illustrative embodiments provide one or more technical solutions that overcome a technical problem with engaging readers any time any place in any language to determine reading comprehension levels. As a result, these one or more technical solutions provide a technical effect and practical application in the field of LLMs.

With reference now to FIG. 2, a diagram illustrating an example of an interactive reading system is depicted in accordance with an illustrative embodiment. Interactive reading system 201 may be implemented in a computing environment, such as computing environment 100 in FIG. 1. Interactive reading system 201 is a system of hardware and software components for interactively engaging readers.

In this example, interactive reading system 201 includes computer 202, client device 204, and digital book database 206. Computer 202 can be, for example, computer 101 in FIG. 1. Client device 204 can be, for example, EUD 103 in FIG. 1. Digital book database 206 can be, for example, remote database 130 in FIG. 1. However, it should be noted that interactive reading system 201 is intended as an example only and not as a limitation on illustrative embodiments. For example, interactive reading system 201 can include any number of computers, client devices, digital book databases, and other devices and components not shown.

Computer 202 includes AI-based virtual interactive reading assistant 208. AI-based virtual interactive reading assistant 208 is implemented by, for example, AI-based virtual interactive reading assistant code 200 in FIG. 1. AI-based virtual interactive reading assistant 208 contains LLM 210. LLM 210 is trained using prompt engineering.

AI-based virtual interactive reading assistant 208 communicates with user 212 via client device 204. User 212 is a registered user of the services provided by AI-based virtual interactive reading assistant 208.

At 214, AI-based virtual interactive reading assistant 208 determines whether interactive session parameters are set for user 212. The interactive session parameters can include, for example, title of book selected, preferred reading pace of user 212, preferred interaction schedule of user 212, preferred book genres of user 212, preferred language of user 212, and the like.

If the interactive session parameters are set for user 212, then, at 216, AI-based virtual interactive reading assistant 208 starts a current interactive session with user 212. In addition, at 218, AI-based virtual interactive reading assistant 208 sends a reading schedule reminder to user 212. At 220, AI-based virtual interactive reading assistant 208 tracks the reading progress of user 212 according to a set reading schedule.

If the interactive session parameters are not set for user 212, then, at 222, AI-based virtual interactive reading assistant 208 selects a book for user to read from digital book database 206 based on, for example, previously read books by user 212. It should be noted that digital book database 206 can represent a plurality of different digital book databases located around the world. At 224, AI-based virtual interactive reading assistant 208 establishes the interactive session parameters. At 226, AI-based virtual interactive reading assistant 208 inputs personalized features corresponding to user 212 as contextual information into LLM 210 for prompt engineering.

At 228, AI-based virtual interactive reading assistant 208, using LLM 210 via prompt engineering, establishes a discussion with user 212 regarding the selected book according to the set reading schedule based on tracking the reading progress of user 212. Further, at 230, AI-based virtual interactive reading assistant 208, using LLM 210, records the key points of the discussion.

At 232, AI-based virtual interactive reading assistant 208 determines whether the current interactive session with user 212 has ended. If the current interactive session has not ended, then AI-based virtual interactive reading assistant 208 continues the discussion with user 212. If the current interactive session has ended, then, at 234, AI-based virtual interactive reading assistant 208 determines whether this is a final interactive session with user 212 for the selected book. If this is not the final interactive session with user 212 for the selected book, then, at 236, AI-based virtual interactive reading assistant 208 waits for the next scheduled interactive session to start. If this is the final interactive session with user 212 for the selected book, then AI-based virtual interactive reading assistant 208 asks user 212 if user 212 would like to read another book.

Figure 3A:
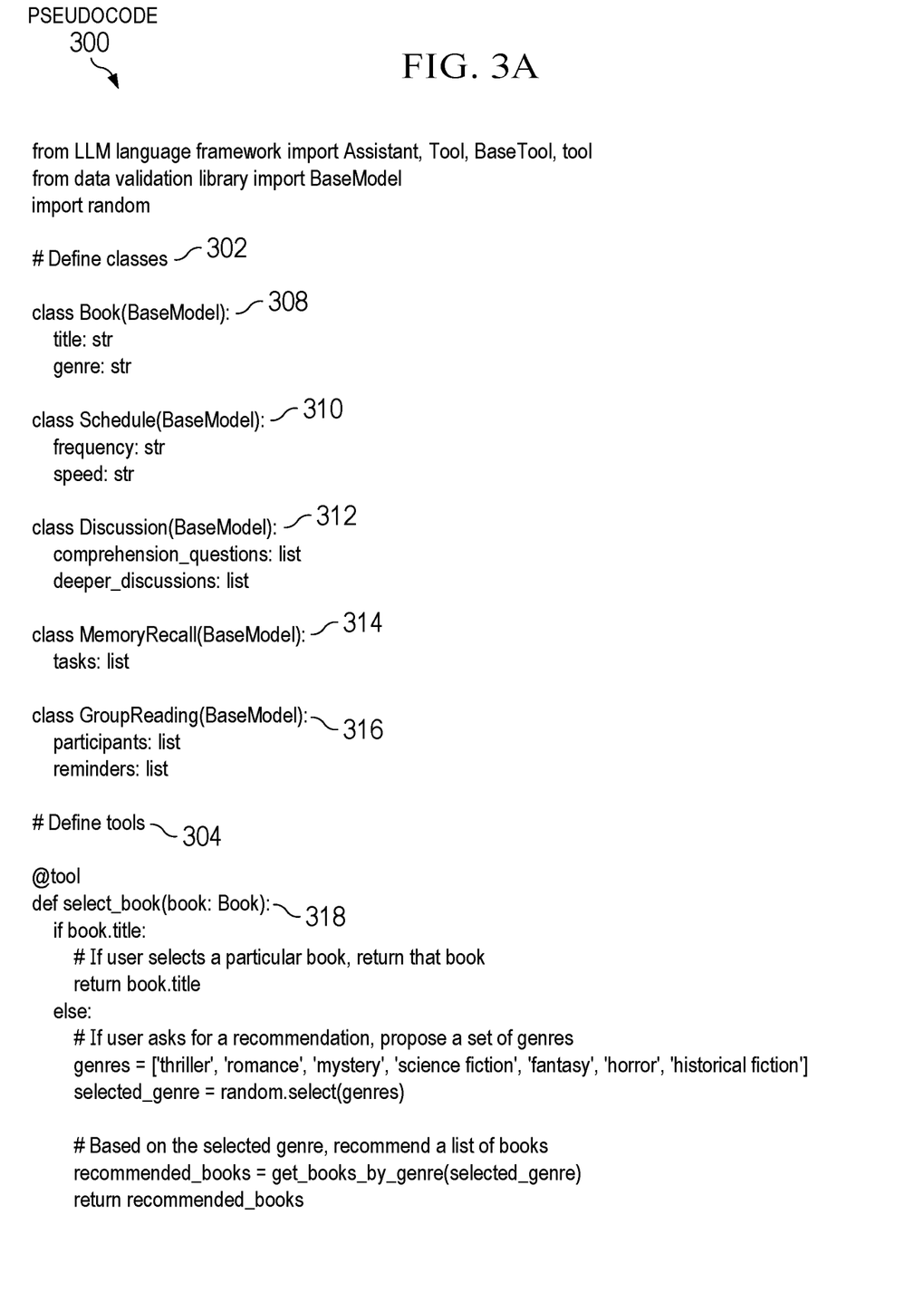
FIGS. 3A-3C are a diagram illustrating an example of pseudocode in accordance with an illustrative embodiment.
Figure 3B:
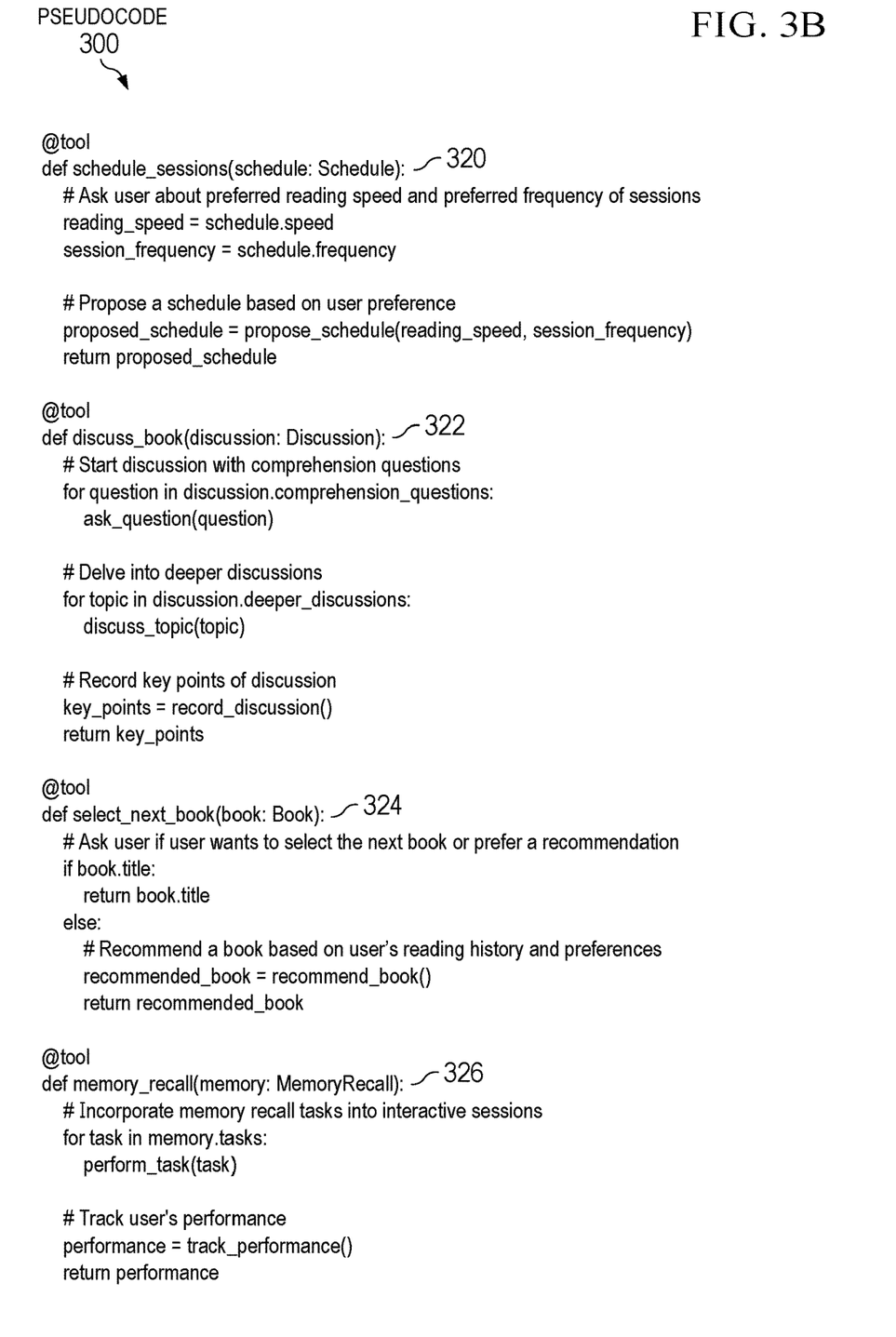
Figure 3C:
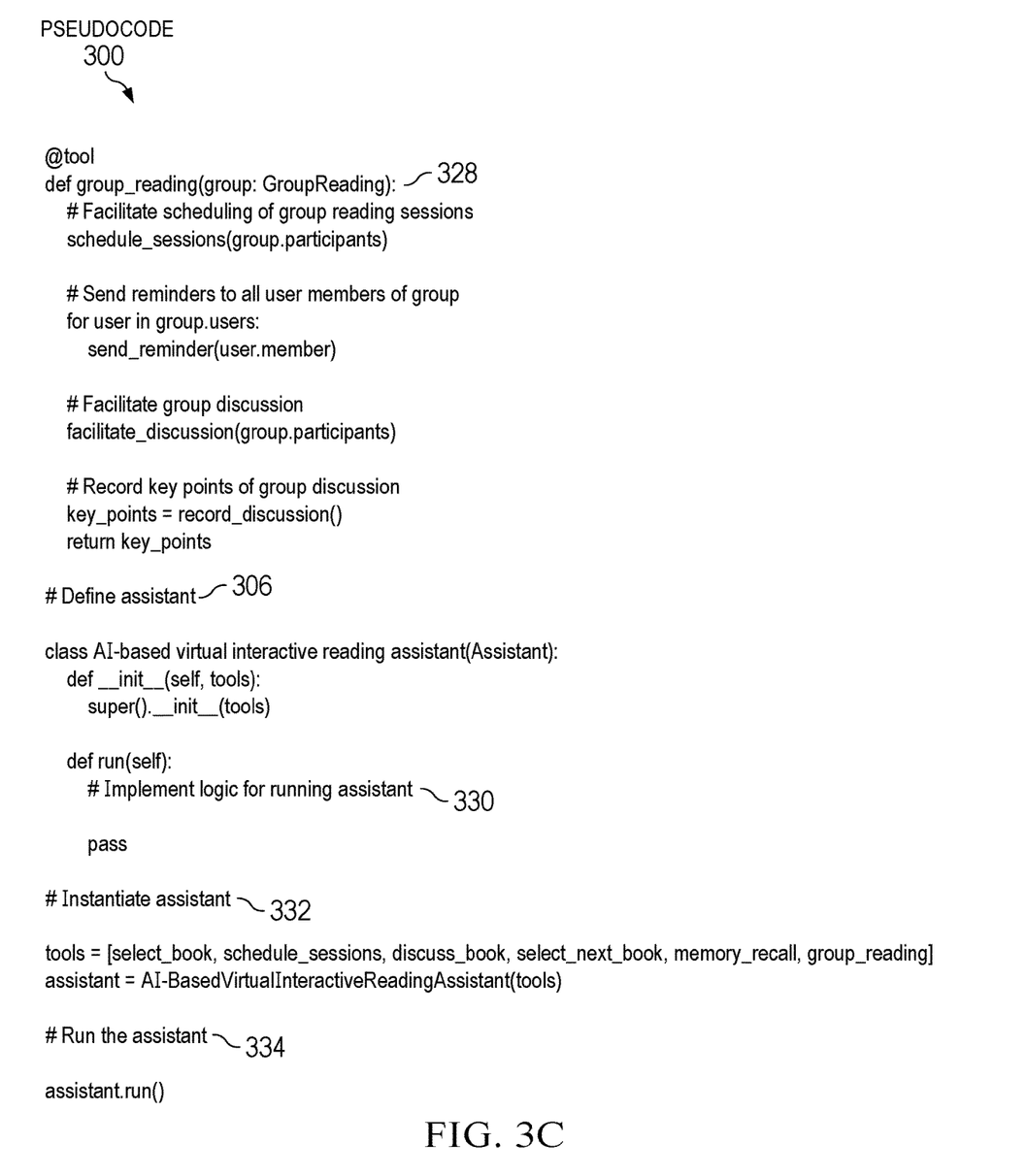

With reference now to FIGS. 3A-3C, a diagram illustrating an example of pseudocode is depicted in accordance with an illustrative embodiment. Pseudocode 300 can be implemented in AI-based virtual interactive reading assistant code 200 in FIG. 1.

In this example, pseudocode 300 defines a plurality of tasks that an AI-based virtual interactive reading assistant of illustrative embodiments, such as AI-based virtual interactive reading assistant 208 in FIG. 2, is to perform. In other words, pseudocode 300 provides a high-level structure for implementing the AI-based virtual interactive reading assistant of illustrative embodiments. However, it should be noted that that pseudocode 300 is intended as an example only and not as a limitation on illustrative embodiments.

In this example, pseudocode 300 includes define classes 302, define tools 304, and define assistant 306. Define classes 302 includes class book 308, class schedule 310, class discussion 312, class memory recall 314, and class group reading 316. Define tools 304 includes tool define select book 318, tool define schedule sessions 320, tool define discuss book 322, tool define select next book 324, tool define memory recall 326, and tool define group reading 328. Define assistant 306 includes implement logic for running assistant 330, instantiate assistant 332, and run assistant 334.

However, it should be noted that tasks, such as, for example, get_books_by_genre( ), propose_schedule( ), ask_question( ), discuss_topic( ), record_discussion( ), recommend_book( ), perform_task( ), track_performance( ), schedule_sessions( ), send_reminder( ), and facilitate_discussion( ) in pseudocode 300 are placeholders for the actual implementation of these tasks. Illustrative embodiments can implement such tasks utilizing known technologies or processes.

Figure 4A:
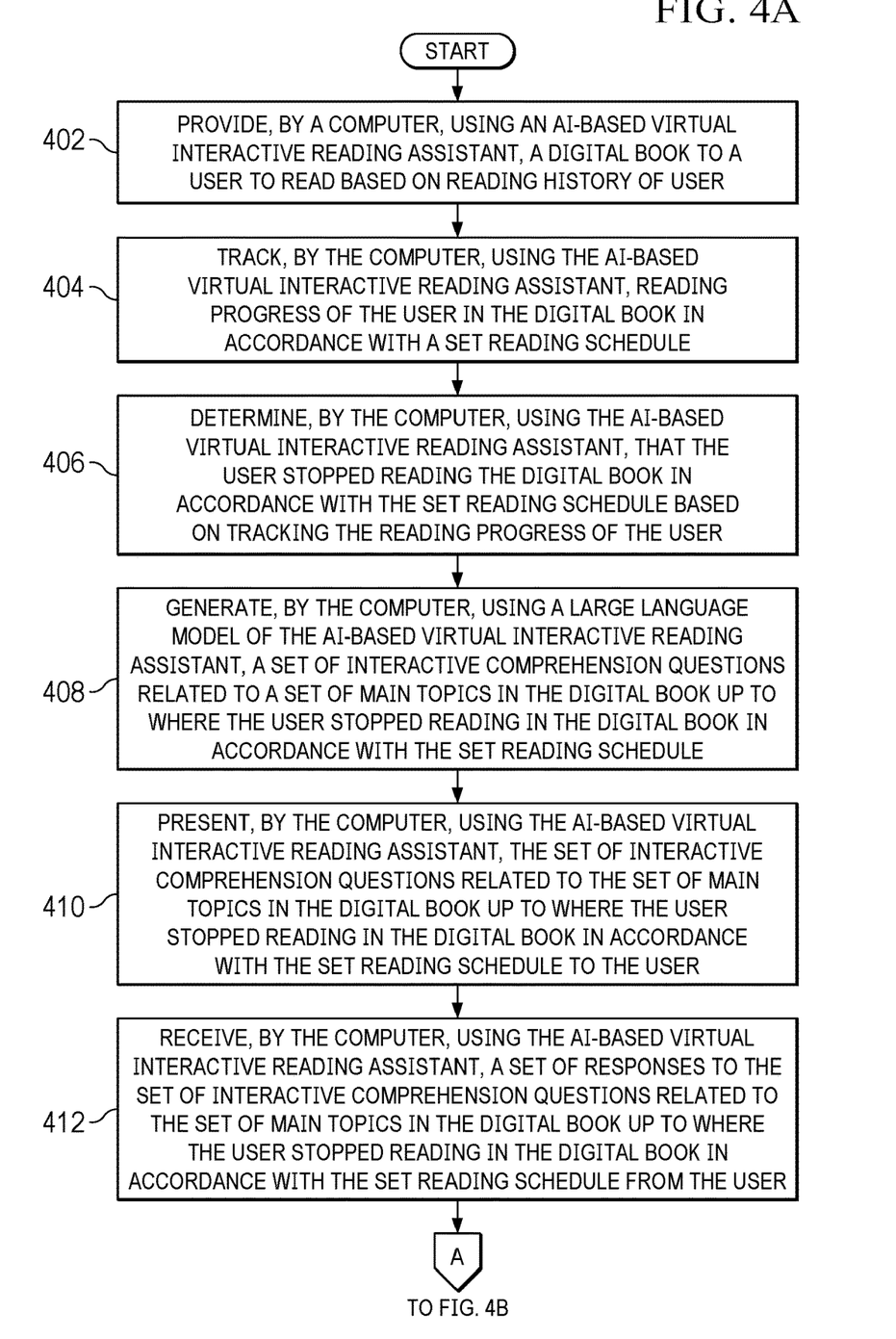
FIGS. 4A-4B are a flowchart illustrating a process for interactive reading comprehension in accordance with an illustrative embodiment.
Figure 4B:
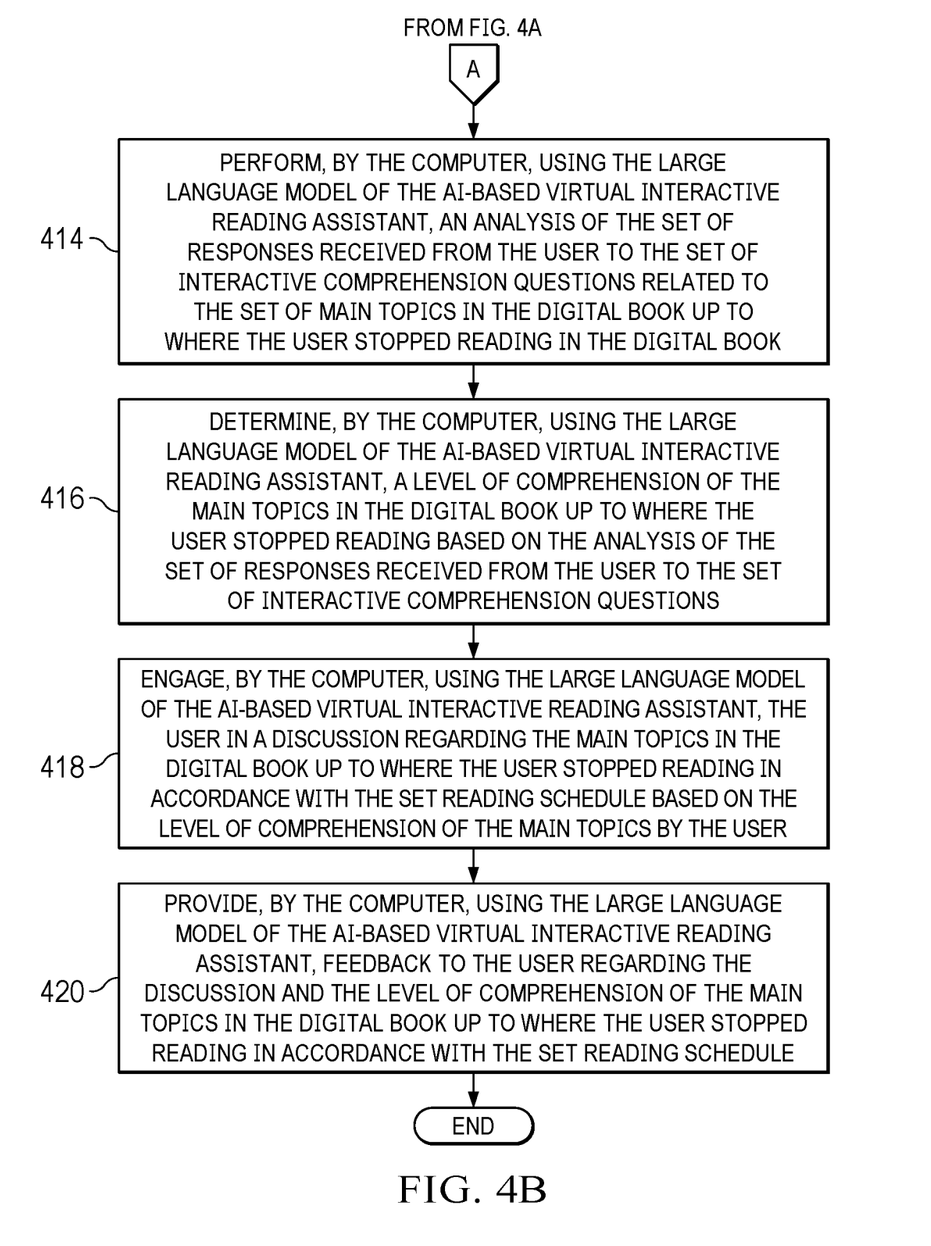

With reference now to FIGS. 4A-4B, a flowchart illustrating a process for interactive reading comprehension is shown in accordance with an illustrative embodiment. The process shown in FIGS. 4A-4B may be implemented in a computer, such as, for example, computer 101 in FIG. 1 or computer 202 in FIG. 2. For example, the process shown in FIGS. 4A-4B may be implemented by AI-based virtual interactive reading assistant code 200 in FIG. 1 or AI-based virtual interactive reading assistant 208 in FIG. 2.

The process begins when the computer, using an AI-based virtual interactive reading assistant, provides a digital book to a user to read based on reading history of user (step 402). The computer, using the AI-based virtual interactive reading assistant, tracks reading progress of the user in the digital book in accordance with a set reading schedule (step 404). The computer, using the AI-based virtual interactive reading assistant, determines that the user stopped reading the digital book in accordance with the set reading schedule based on tracking the reading progress of the user (step 406).

The computer, using a large language model of the AI-based virtual interactive reading assistant, generates a set of interactive comprehension questions related to a set of main topics in the digital book up to where the user stopped reading in the digital book in accordance with the set reading schedule (step 408). The computer, using the AI-based virtual interactive reading assistant, presents the set of interactive comprehension questions related to the set of main topics in the digital book up to where the user stopped reading in the digital book in accordance with the set reading schedule to the user (step 410). The computer, using the AI-based virtual interactive reading assistant, receives a set of responses to the set of interactive comprehension questions related to the set of main topics in the digital book up to where the user stopped reading in the digital book in accordance with the set reading schedule from the user (step 412).

The computer, using the large language model of the AI-based virtual interactive reading assistant, performs an analysis of the set of responses received from the user to the set of interactive comprehension questions related to the set of main topics in the digital book up to where the user stopped reading in the digital book in accordance with the set reading schedule (step 414). The computer, using the large language model of the AI-based virtual interactive reading assistant, determines a level of comprehension of the main topics in the digital book up to where the user stopped reading based on the analysis of the set of responses received from the user to the set of interactive comprehension questions (step 416).

The computer, using the large language model of the AI-based virtual interactive reading assistant, engages the user in a discussion regarding the main topics in the digital book up to where the user stopped reading in accordance with the set reading schedule based on the level of comprehension of the main topics by the user (step 418). The computer, using the large language model of the AI-based virtual interactive reading assistant, provides feedback to the user regarding the discussion and the level of comprehension of the main topics in the digital book up to where the user stopped reading in accordance with the set reading schedule (step 420). Thereafter, the process terminates.

Thus, illustrative embodiments of the present disclosure provide a computer-implemented method, computer system, and computer program product for determining interactive book reading comprehension. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for interactively determining reading comprehension of a user by actively engaging the user in discussions regarding a digital book, the computer-implemented method comprising:
    providing, by the computer, using a large language model of an artificial intelligence (AI)-based virtual interactive reading assistant, the digital book to a user to read, wherein the digital book is maintained in a digital book database accessible by the computer;
    tracking, by the computer, using the large language model of the AI-based virtual interactive reading assistant, reading progress of the user in the digital book in accordance with the set reading schedule;
    determining, by the computer, using the large language model of the AI-based virtual interactive reading assistant, that the user stopped reading the digital book in accordance with the set reading schedule based on tracking reading progress of the user;
    generating, by the computer, using the large language model of the AI-based virtual interactive reading assistant, a set of interactive comprehension questions related to a set of main topics in the digital book up to where the user stopped reading in the digital book in accordance with the set reading schedule;
    presenting, by the computer, using the large language model of the AI-based virtual interactive reading assistant, the set of interactive comprehension questions related to the set of main topics in the digital book up to where the user stopped reading in the digital book in accordance with the set reading schedule to the user;
    receiving, by the computer, using the large language model of the AI-based virtual interactive reading assistant, a set of responses to the set of interactive comprehension questions related to the set of main topics in the digital book up to where the user stopped reading in the digital book in accordance with the set reading schedule from the user;
    performing, by a computer, using the large language model of the artificial intelligence (AI)-based virtual interactive reading assistant, an analysis of the set of responses received from the user to the set of interactive comprehension questions related to the set of main topics in the digital book up to where the user stopped reading in the digital book in accordance with a set reading schedule, wherein the large language model of the AI-based virtual interactive reading assistant is implemented by AI-based virtual interactive reading assistant code maintained in a memory of the computer;
    determining, by the computer, using the large language model of the AI-based virtual interactive reading assistant, a level of comprehension of the main topics in the digital book up to where the user stopped reading based on the analysis of the set of responses received from the user to the set of interactive comprehension questions;
    engaging, by the computer, using the large language model of the AI-based virtual interactive reading assistant, the user in a discussion regarding the main topics in the digital book up to where the user stopped reading in accordance with the set reading schedule based on the level of comprehension of the main topics by the user;
    providing, by the computer, using the large language model of the AI-based virtual interactive reading assistant, feedback to the user regarding the discussion and the level of comprehension of the main topics in the digital book up to where the user stopped reading in accordance with the set reading schedule;
    recording, by the computer, using the large language model of the AI-based virtual interactive reading assistant, key points of the discussion between the AI-based virtual interactive reading assistant and the user regarding the main topics in the digital book;
    inputting, by the computer, using the AI-based virtual interactive reading assistant, personalized features corresponding to the user into the large language model for prompt engineering;
    incorporating, by the computer, using the large language model of the AI-based virtual interactive reading assistant, cognitive exercises into the discussion between the AI-based virtual interactive reading assistant and the user regarding the main topics in the digital book;
    recording, by the computer, using the large language model of the AI-based virtual interactive reading assistant, the user's performance during the cognitive exercises; and
    providing, by the computer, using the large language model of the AI-based virtual interactive reading assistant, cognitive performance feedback to the user based on responses provided by the user to the cognitive exercises during the discussion between the AI-based virtual interactive reading assistant and the user regarding the main topics in the digital book.

2. A computer system for interactively determining reading comprehension of a user by actively engaging the user in discussions regarding a digital book, the computer system comprising:
    a communication fabric;
    a set of computer-readable storage media connected to the communication fabric, wherein the set of computer-readable storage media collectively stores program instructions; and
    a set of processors connected to the communication fabric, wherein the set of processors executes the program instructions to:
        provide, using the AI-based virtual interactive reading assistant, a digital book to the user to read, wherein the digital book is maintained in a digital book database accessible by the computer system;
        track, using the AI-based virtual interactive reading assistant, reading progress of the user in the digital book in accordance with the set reading schedule;
        determine, using the AI-based virtual interactive reading assistant, that the user stopped reading the digital book in accordance with the set reading schedule based on tracking reading progress of the user;
        generate, using the large language model of the AI-based virtual interactive reading assistant, a set of interactive comprehension questions related to a set of main topics in the digital book up to where the user stopped reading in the digital book in accordance with the set reading schedule;

present, using the AI-based virtual interactive reading assistant, the set of interactive comprehension questions related to the set of main topics in the digital book up to where the user stopped reading in the digital book in accordance with the set reading schedule to the user;

receive, using the AI-based virtual interactive reading assistant, a set of responses to the set of interactive comprehension questions related to the set of main topics in the digital book up to where the user stopped reading in the digital book in accordance with the set reading schedule from the user;

perform, using the large language model of the artificial intelligence (AI)-based virtual interactive reading assistant, an analysis of the set of responses received from the user to the set of interactive comprehension questions related to the set of main topics in the digital book up to where the user stopped reading in the digital book in accordance with a set reading schedule, wherein the large language model of the AI-based virtual interactive reading assistant is implemented by AI-based virtual interactive reading assistant code maintained in a memory of the computer system;

determine, using the large language model of the AI-based virtual interactive reading assistant, a level of comprehension of the main topics in the digital book up to where the user stopped reading based on the analysis of the set of responses received from the user to the set of interactive comprehension questions;

engage, using the large language model of the AI-based virtual interactive reading assistant, the user in a discussion regarding the main topics in the digital book up to where the user stopped reading in accordance with the set reading schedule based on the level of comprehension of the main topics by the user;

provide, using the large language model of the AI-based virtual interactive reading assistant, feedback to the user regarding the discussion and the level of comprehension of the main topics in the digital book up to where the user stopped reading in accordance with the set reading schedule;

record, using the large language model of the AI-based virtual interactive reading assistant, key points of the discussion between the AI-based virtual interactive reading assistant and the user regarding the main topics in the digital book;

input, using the AI-based virtual interactive reading assistant, personalized features corresponding to the user into the large language model for prompt engineering;

incorporate, using the large language model of the AI-based virtual interactive reading assistant, cognitive exercises into the discussion between the AI-based virtual interactive reading assistant and the user regarding the main topics in the digital book;

record, using the large language model of the AI-based virtual interactive reading assistant, the user's performance during the cognitive exercises; and provide, using the large language model of the AI-based virtual interactive reading assistant, cognitive performance feedback to the user based on responses provided by the user to the cognitive exercises during the discussion between the AI-based virtual interactive reading assistant and the user regarding the main topics in the digital book.

3. A computer program product for interactively determining reading comprehension of a user by actively engaging the user in discussions regarding a digital book, the computer program product comprising a set of computer-readable storage media having program instructions collectively stored therein, the program instructions executable by a computer to cause the computer to:

provide, using the AI-based virtual interactive reading assistant, a digital book to the user to read;

track, using the AI-based virtual interactive reading assistant, reading progress of the user in the digital book in accordance with the set reading schedule;

determine, using the AI-based virtual interactive reading assistant, that the user stopped reading the digital book in accordance with the set reading schedule based on tracking reading progress of the user;

generate, using the large language model of the AI-based virtual interactive reading assistant, a set of interactive comprehension questions related to a set of main topics in the digital book up to where the user stopped reading in the digital book in accordance with the set reading schedule;

present, using the AI-based virtual interactive reading assistant, the set of interactive comprehension questions related to the set of main topics in the digital book up to where the user stopped reading in the digital book in accordance with the set reading schedule to the user;

receive, using the AI-based virtual interactive reading assistant, a set of responses to the set of interactive comprehension questions related to the set of main topics in the digital book up to where the user stopped reading in the digital book in accordance with the set reading schedule from the user;

perform, using the large language model of the artificial intelligence (AI)-based virtual interactive reading assistant, an analysis of the set of responses received from the user to the set of interactive comprehension questions related to the set of main topics in the digital book up to where the user stopped reading in the digital book in accordance with a set reading schedule, wherein the large language model of the AI-based virtual interactive reading assistant is implemented by AI-based virtual interactive reading assistant code maintained in a memory of the computer;

determine, using the large language model of the AI-based virtual interactive reading assistant, a level of comprehension of the main topics in the digital book up to where the user stopped reading based on the analysis of the set of responses received from the user to the set of interactive comprehension questions;

engage, using the large language model of the AI-based virtual interactive reading assistant, the user in a discussion regarding the main topics in the digital book up to where the user stopped reading in accordance with the set reading schedule based on the level of comprehension of the main topics by the user;

provide, using the large language model of the AI-based virtual interactive reading assistant, feedback to the user regarding the discussion and the level of comprehension of the main topics in the digital book up to where the user stopped reading in accordance with the set reading schedule;

record, using the large language model of the AI-based virtual interactive reading assistant, key points of the discussion between the AI-based virtual interactive reading assistant and the user regarding the main topics in the digital book;

input, using the AI-based virtual interactive reading assistant, personalized features corresponding to the user into the large language model for prompt engineering;

incorporate, using the large language model of the AI-based virtual interactive reading assistant, cognitive exercises into the discussion between the AI-based virtual interactive reading assistant and the user regarding the main topics in the digital book;

record, using the large language model of the AI-based virtual interactive reading assistant, the user's performance during the cognitive exercises; and provide, using the large language model of the AI-based virtual interactive reading assistant, cognitive performance feedback to the user based on responses provided by the user to the cognitive exercises during the discussion between the AI-based virtual interactive reading assistant and the user regarding the main topics in the digital book.

\* \* \* \* \*